Patented Oct. 14, 1941

2,258,629

UNITED STATES PATENT OFFICE 2,258,629

METHOD OF PREPARING SODIUM PHOSPHATE

Benjamin A. Smith, Rocky River, Ohio, assignor to The C. O. Bartlett & Snow Company, Cleveland, Ohio, a corporation of Ohio No Drawing. Application September 8, 1938, Serial No. 228,963

6 Claims. (Cl. 34—24)

This invention relates, as indicated, to a method of preparing sodium phosphate and relates more particularly to that portion of the general process for the preparation of this material which entails the removal of at least a substantial portion of the water of crystallization of the material.

Throughout the following description, reference will be had particularly to the preparation of or treatment of di-sodium acid phosphate as an example.

Di-sodium acid phosphate, as delivered from the centrifuges where the crystalline material is separated from the mother liquor, usually contains minor amounts on the order of about 3% of free water and 12 molecules of water of crystallization, this material being conveniently identified by the following formula:

$$Na_2HPO_4 \cdot 12H_2O$$

This material is a wet crystalline mass and it is quite difficult to remove, not only the free water, but particularly the water of crystallization therefrom, since a heating of the material to an elevated temperature in order to liberate the water of crystallization results in a deliquescence of the same so that a clear liquid mass is produced which is extremely difficult to treat.

I am aware that prior workers in the art, in attempting to remove the water of crystallization from the di-sodium acid phosphate, have combined therewith about equal parts of substantially dehydrated material, this acting as an absorbent for the water liberated from the fresh material upon heating; the entire mass being then dehydrated by passing a stream of heated air thereover.

It is a principal object of my invention to provide a process whereby the water content of the sodium phosphate may be reduced to the equivalent of on the order of about one to one and one-fourth molecules of water of crystallization without any recirculating of previously dehydrated material which, as indicated, has characterized the prior art processes; my invention being characterized by a rather critical control over certain essential conditions making possible the carrying out of the process in a simple continuous flow manner.

Other objects of my invention will appear as the description proceeds.

To the accomplishment of the foregoing and related ends, said invention, then consists of the steps hereinafter fully described and particularly pointed out in the claims, the following description setting forth in detail one approved method of carrying out the invention, such disclosed method, however, constituting but one of the various ways in which the principle of the invention may be used.

Broadly stated, my invention comprises the removal of a substantial portion of the water (both free and water of crystallization) from sodium phosphate, particularly di-sodium acid phosphate, by moving a stream of heated air in counterflow relation thereto under carefully controlled conditions.

The apparatus which may be employed in carrying out my process may be any conventional rotary calciner or kiln, rotary drier, Hereschoff furnace or Wedge furnace. These forms of apparatus are sufficiently well-known to those familiar with the art so that a more specific description thereof is believed unnecessary.

It will be observed that a common characteristic of each of these different forms of apparatus is that they are capable of moving the material to be treated and the treating gases therefor in counterflow relation while maintaining a dispersion of the stream to material to be treated so that intimate contact of the treating gases may be had therewith.

The treating gases which may be employed when carrying out my process may be hot air or the hot gases produced by the combustion of conventional fuels such as coal, gas, oil, etc. The employment of fluid fuels such as gas or oil is preferred in apparatus of the character described, since by such fuel the temperature of the hot gases or heated air may be more accurately and more conveniently controlled.

It is of course within the contemplation of my invention to use pure heated air which has been elevated to the proper temperature by being passed through a conventional heat exchanger.

I have found that in order to successfully carry out the process of removing the water of crystallization from sodium acid phosphate it is necessary that the proper temperature gradient be maintained between the treating gases and the material to be treated. It is essential that the rate of heat transfer from the treating gases to the material being treated resulting in a liberation of the water of crystallization be closely related to the rate of air flow over the material in order that the water thus liberated may be carried off as rapidly as it is liberated, thus preventing a deliquescence of the crystals.

The following limits as to temperature and the like have been established by employing a conventional rotary drier, i. e., a cylindrical drum rotatably mounted on supporting rollers in a slightly inclined position and internally provided with lifting flights which carry the material upwardly and shower the same across the interior of the drum in a slightly advanced position as the drum is rotated.

One form of rotary drier suitable for the purpose of carrying out my invention is a direct fired counter-current rotary type drier manufactured and sold by The C. O. Bartlett and Snow Company, of Cleveland, Ohio, and has a cylinder of 72" inside diameter, 40' long, arranged at a slope to the horizontal of approximately 0.18" per foot and rotated at a speed of from 1 to 3 R. P. M.

The material to be treated, i. e., the sodium acid phosphate containing 12 molecules of water of crystallization with about 3% of uncombined or free water is fed into one end of the cylinder at room temperature, i. e., from about 60 to about 80 degrees or higher. The heated air or treating gases are introduced to the cylinder at its opposite end, so that the material and the gases move in counterflow relation as they traverse the cylinder. The temperature of the air stream introduced to the cylinder (at the material discharge end thereof) should be rather carefully controlled and be from about 175° to about 190° F. and preferably between 180° F. and 186° F.

The velocity of the stream of gas through the cylinder should likewise be carefully controlled; 135 feet per minute is the maximum velocity for such gas stream. Velocities greater than this will be found to interfere with the travel of the material through the cylinder, actually causing the material to pile up at and be thrown out of the charging end of the cylinder. The minimum velocity of the air stream passing through the cylinder is determined by the dew point of the air as it leaves the cylinder. The velocity of the air stream passing through the cylinder should be so adjusted that the temperature thereof as it leaves the cylinder is at least 15° F. and preferably 50° F. higher than the dew point of the air as it leaves the cylinder.

Very satisfactory results have been secured by employing an air stream of 120 feet per minute, which, under the particular conditions of operation, i. e., with the air stream entering the cylinder maintained at between 180° F. and 186° F. result in a temperature of 132° F. to 137° F. in the air stream leaving the cylinder, such air stream having a dew point between 77° and 81° F.

Under the conditions above specified, the time of travel of the material being treated through the cylinder was about six hours, and as discharged at a temperature of about 140° F. was in white, powdery, granular form containing upon analysis an average of about 1 to about 1¼ molecules of water of crystallization.

The process is characterized by the fact that there is substantially no dust loss; in fact, I have carried on the operation with no dust loss whatsoever.

By maintaining the accurate control above specified it will be observed that di-sodium acid phosphate containing 12 molecules of water of crystallization and a minor amount of free water, i. e., on the order of about 3%, may be converted to di-sodium acid phosphate containing on the order of about 1 molecule of water of crystallization by merely passing the material through the treating apparatus in counter-current relation to the stream of treating gas. Thus, no recirculation is necessary and since the temperature controls required may be readily secured by fully automatic apparatus, it will be observed that my process is particularly applicable for large scale commercial installations.

Other modes of applying the principle of my invention may be employed instead of the one explained, change being made as regards the method herein disclosed, provided the step or steps stated by any of the following claims or the equivalent of such stated step or steps be employed.

I, therefore, particularly point out and distinctly claim as my invention:

1. The process of removing a substantial portion of the water of crystallization from di-sodium acid phosphate containing a substantial amount of water of crystallization which comprises moving continuous streams of the material and heated air in counterflow relation, such stream of air as it meets the stream of material having a temperature of about 175° F. to about 190° F., the movement of such stream of air relatively to the material being at a rate not greater than about 135 feet per minute but sufficient so that the temperature of the air leaving the material is at least 15° F. higher than the dew point of such air.

2. The process of reducing to a substantially anhydrous condition di-sodium acid phosphate containing a minor amount of free water and a substantial amount of water of crystallization which comprises moving continuous streams of the material and heated air in counterflow relation, such stream of air as it meets the stream of material having a temperature of about 175° F. to about 190° F., the movement of such stream of air relatively to the material being at a rate not greater than about 135 feet per minute but sufficient so that the temperature of the air leaving the material is at least 15° F. higher than the dew point of such air.

3. The process of reducing di-sodium acid phosphate containing about 12 moles of water of crystallization to di-sodium acid phosphate containing an average of less than 2 moles of water of crystallization which comprises moving continuous streams of the material being treated and heated air in counterflow relation, such stream of air as it meets the stream of material having a temperature of about 175° F. to about 190° F., the movement of such stream of air relatively to the material being at a rate not greater than about 135 feet per minute but sufficient so that the temperature of the air leaving the material is at least 15° F. higher than the dew point of such air.

4. The process of removing a substantial portion of the water of crystallization from di-sodium acid phosphate containing a substantial amount of water of crystallization which comprises moving continuous streams of the material being treated and heated air in counterflow relation, such stream of air as it meets the stream of material having a temperature of about 180° F. to about 186° F., the movement of such stream of air relatively to the material being at a rate not greater than about 135 feet per minute but sufficient so that the temperature of the air leaving the material is at least 50° F. higher than the dew point of such air.

5. The continuous process of reducing di-sodium phosphate containing a minor amount of free water and about 12 moles of water of crystallization to substantially anhydrous form containing less than an average of about one and one-half moles of water of crystallization which comprises moving continuous streams of the material and heated air in counterflow relation at such rates that the material being treated remains in treating relation to the air stream for a period of about six hours, such stream of air as it meets the stream of material having a temperature of about 175° F. to about 190° F. and the movement of such stream of air relatively to the material being at a rate not greater than about 135 feet per minute but sufficient so that the temperature of the air leaving the material is at least 15° F. higher than the dew point of such air.

6. The continuous process of reducing disodium phosphate containing a minor amount of free water and about 12 moles of water of crystallization to substantially anhydrous form containing less than an average of about one and one-half moles of water of crystallization which comprises moving continuous streams of the material and heated air in counterflow relation at such rates that the material being treated remains in treating relation to the air stream for a period of about six hours, such stream of air as it meets the stream of material having a temperature of about 180° F. to about 186° F. and the movement of such stream of air relatively to the material being at a rate not greater than about 135 feet per minute but sufficient so that the temperature of the air leaving the material is at least 50° F. higher than the dew point of such air.

BENJAMIN A. SMITH.